UNITED STATES PATENT OFFICE.

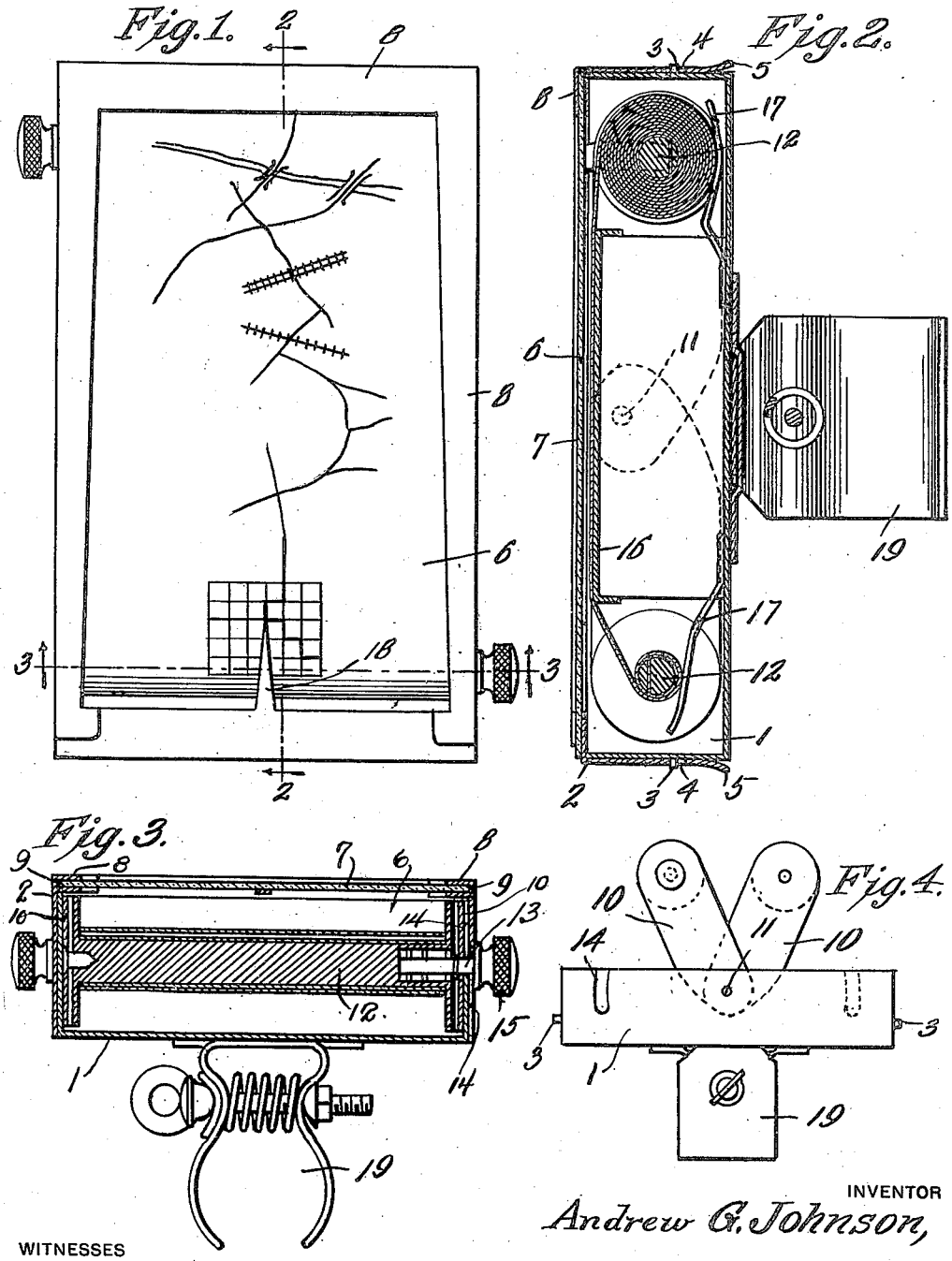

ANDREW G. JOHNSON, OF STILLMAN VALLEY, ILLINOIS.

MAP-BOX AND MAP.

1,312,445.         Specification of Letters Patent.         Patented Aug. 5, 1919.

Application filed June 18, 1918. Serial No. 240,569.

*To all whom it may concern:*

Be it known that I, ANDREW G. JOHNSON, a citizen of the United States, residing at Stillman Valley, in the county of Ogle and State of Illinois, have invented certain new and useful Improvements in Map-Boxes and Maps, of which the following is a specification.

This invention relates to road finders, and more particularly to a device for indicating to the operator of a vehicle, the proper course or route which should be followed to reach a certain objective point.

The principal object of the invention is to provide a container for a road map having suitable delineations for indicating to the operator of a vehicle upon which the device is mounted, the proper course of travel determined from the delineations on the road map, whereby the most desirable and preferred route may be followed when the highways and roads are unfamiliar to the operator.

The invention also aims to provide a device of this character which will occupy a relatively small space and employ a comparatively large map whereby directions and detailed instructions to the operator may be brought under the operators observation for determining the proper course of travel without danger of going astray.

A further object of the invention is to provide a device of this character which consists of comparatively few parts and is simple in construction, but durable and well adapted to withstand the rough usage to which devices of this character are ordinarily subjected.

For a full description of the invention and the advantages and merits thereof, reference is to be had to the following description and accompanying drawings, in which:—

Figure 1 is a plan view of the device constructed in accordance with my invention, illustrating the same with the glass panel removed.

Fig. 2 is a longitudinal section taken on the line 2—2 of Fig. 1, showing the glass panel mounted in position.

Fig. 3 is a transverse section taken on the line 3—3 of Fig. 1.

Fig. 4 is a smaller side elevation with the road map removed and illustrating the manner of changing the map in the container.

Referring to the drawing, in which like numerals of reference indicate corresponding parts throughout the several views, the map box comprises a receptacle or container 1, of substantially rectangular formation, and of any preferred depth. The receptacle is provided with a cover 2 the sides and end walls of which fit over the side and end walls of the receptacle. To prevent accidental or casual displacement of the cover from the receptacle when the former is mounted in position, each end wall of the receptacle has an outwardly extending pin 3 adapted to register with an aperture 4 formed in each end wall of the cover. To facilitate this registration of each pin with its aperture, each end wall of the cover is slightly pressed outwardly to form a lip 5 whereby the end of the cover may spring outwardly and over the pins 3 when the cover is forced downwardly into position on the receptacle. In this manner the pins 3 register with the apertures and the cover is properly held in position on the receptacle. A comparatively large sight opening 6 is provided in the top of the cover, the material in the top around the marginal edge of the opening, forming a flange upon which rests the glass panel 7 which extends across the sight opening and is held in position by the superimposed flanges 8 carried by the cover and which extend along each of the opposite longitudinal sides and one of the ends of the cover to form a channel 9 to receive the marginal side edges and one end edge of the glass panel. The opposite end is open to facilitate insertion and removal of the glass panel when desired.

The map holder comprises pivoted arms 10 which are arranged in pairs at opposite sides of the receptacle and each pair has its meeting ends overlapped and pivotally mounted on a pivot pin 11 which is carried by the side wall of the receptacle and is disposed intermediate the length thereof and at a point near the upper marginal edge of the side wall. In this manner, each pair of arms 10 is mounted at the opposite sides of the receptacle and within the same whereby the arms may be swung to the position shown by full lines in Fig. 4 of the drawing. The free ends of the arms 10 carry map rollers 12 and the map is in a long sheet adapted to be wound and unwound from the roller. Each roller has secured to one end thereof, a turning pin 13 which projects beyond the sides of the receptacle and cover and through arcuate slots 14 formed in the same and the outer end of each pin 13 is provided with a finger nut or knob 15 whereby either one of the rollers may be turned to wind and unwind the map. In order that the portion of the map between the rollers may be readily observed by the operator, it is held in close proximity to the glass panel directly beneath the same by a centrally located platform 16 mounted within the receptacle and over which the map travels when the rollers are rotated.

Spring clips 17 attached to the bottom of the receptacle on the interior thereof are engaged with the portions of the map wound upon the rollers and thereby maintain a tension on the rollers to cause the map to remain in a predetermined position after being moved by turning either one of the knobs 15. The cover carries a pointer or indicator finger 18 at one end thereof which has its terminal pointed longitudinally and in a position to indicate the center of the map as it is moved longitudinally by turning the rollers in either direction. The map, of course, may be suitably delineated with instructions and the conventional manner of indicating roads, highways, land marks, and other instructions to the operator whereby the proper course may be followed as the pointer designates the various important points along the map when the latter is moved. It will be obvious that the length of the map will be limited only by the capacity of the rollers and the box may be increased in size to permit larger rollers whereby a longer map may be used if desired.

A suitable clamp 19 is attached to the bottom of the receptacle whereby the box may be mounted at a convenient point on the vehicle to be readily observed by the driver or operator.

As shown in Fig. 4, the cover may be removed and the arms 10 swung upwardly and outwardly whereby the map may be removed from the arms to permit mounting of another map whereupon the arms will be swung downwardly, the arcuate slots 14 permitting the pins 13 to assume the desired position at opposite sides of the receptacle whereby the knob may be conveniently rotated to move the map. The cover, of course, is also slotted with similar arcuate slots 14 to permit ready removal and attaching.

The platform 16 also serves as a substantial base when a map is being made, as in this instance, the glass panel will be removed, and the operator will sketch in the various turns in the highway and the essential land marks as the vehicle moves from place to place. During this time, of course, the map or sheet of paper is continually moved from one roller to another.

The foregoing description and accompanying drawings having reference to what might be considered to be the preferred or approved form of my invention, I desire it to be understood that I may make certain changes in the construction and arrangement of parts, materials, dimensions, et cetera, as may prove expedient and fall within the scope of the appended claims.

Having thus fully described my invention what I claim as new and desire to secure by Letters Patent, is:—

1. A road finder comprising a casing, map rollers arranged within the casing, a map wound upon the said rollers, means hingedly mounted in the casing and carrying the rollers and adapted to swing to permit the latter to be swung into and out of the casing, and means to turn the said rollers.

2. A road finder comprising a casing, pivotally mounted arms arranged in pairs at opposite sides of the casing, rollers carried by the free ends of the arms, a map wound upon the rollers, and spring fingers engageable with the wound portions of the map to maintain a tension on the exposed portion thereof.

3. A road finder comprising a casing, pivotally mounted arms arranged in pairs, at opposite sides of the casing, rollers carried by the free ends of the arms, a map wound upon the rollers, and spring fingers engageable with the wound portions of the map to maintain a tension on the exposed portion thereof, and a removable cover mounted on the casing, and engageable with the said arms to normally maintain them in operative position within the casing.

In testimony whereof I affix my signature in presence of two witnesses.

ANDREW G. JOHNSON.

Witnesses:
ALBERT C. BROWN,
CHARLES R. JOHNSON.